(12) United States Patent
Li et al.

(10) Patent No.: US 12,405,889 B1
(45) Date of Patent: Sep. 2, 2025

(54) METHOD AND DEVICE FOR REDUCING CACHE CONSUMPTION

(71) Applicant: MediaTek Singapore Pte. Ltd., Singapore (SG)

(72) Inventors: Ning Li, Beijing (CN); Yunfei Wang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/746,464

(22) Filed: Jun. 18, 2024

(30) Foreign Application Priority Data

May 27, 2024 (CN) .......................... 202410666774.1

(51) Int. Cl.
*G06F 12/0802* (2016.01)
(52) U.S. Cl.
CPC ...... *G06F 12/0802* (2013.01); *G06F 2212/60* (2013.01)
(58) Field of Classification Search
CPC .......................... G06F 12/0802; G06F 2212/60
See application file for complete search history.

(56) References Cited

U.S. PATENT DOCUMENTS

| 2014/0281056 | A1* | 9/2014 | Davda | G06F 12/1027 |
| | | | | 710/26 |
| 2016/0034407 | A1* | 2/2016 | Shankar | G06F 13/385 |
| | | | | 710/22 |
| 2022/0283946 | A1* | 9/2022 | Ng | G06F 12/0238 |
| 2024/0220429 | A1* | 7/2024 | Ng | G06F 9/45558 |
| 2024/0289150 | A1* | 8/2024 | Ng | G06F 9/45558 |

* cited by examiner

*Primary Examiner* — Sean D Rossiter
(74) *Attorney, Agent, or Firm* — McClure, Qualey & Rodack, LP (57) ABSTRACT

A method for reducing cache consumption is provided. The method is implemented by a device. The method includes receiving a registration request from an application, wherein the registration request is used to indicate a buffer with a specific size. The method includes searching a cache pool in an input/output memory management unit (IOMMU) according to the specific size and determining whether the cache pool has an IOMMU buffer matching the buffer. The method includes returning a first IOMMU buffer to the application in response to the cache pool having the first IOMMU buffer matching the buffer.

22 Claims, 10 Drawing Sheets

IOVAs 1~2 are allocated to the application

FIG. 7B

IOVA 3 is allocated to the application

FIG. 7C

IOVAs 1~2 are returned

FIG. 7D

IOVA 3 is returned

METHOD AND DEVICE FOR REDUCING CACHE CONSUMPTION

CROSS REFERENCE TO RELATED APPLICATIONS

This application claims priority from China Patent Application No. 202410666774.1, filed on May 27, 2024, the disclosure of which are incorporated herein in their entirety by reference.

BACKGROUND OF THE INVENTION

Field of the Invention

The present disclosure generally relates to memory access processing techniques. More specifically, aspects of the present disclosure relate to a method and a device for reducing cache consumption.

Description of the Related Art

In smartphones, a direct memory access (DMA) engine often needs to use a large number of contiguous memory areas. The DMA engine cannot use a memory management unit (MMU) of the CPU and can only access contiguous physical blocks in the physical memory. However, it is difficult for the system to allocate a large number of contiguous physical blocks in the physical memory. For example, when the system allocates 60 MB of physical blocks in the physical memory, the system may need to do a lot of sorting in the physical memory, causing an additional system burden.

To solve these problems, an input/output memory management unit (IOMMU) was designed. The IOMMU maps contiguous I/O virtual addresses (IOVAs) of the virtual blocks to non-contiguous physical addresses (PAs) of the physical blocks, and records the mapping relationship in an IOMMU page table. The DMA engine accesses the physical memory according to the IOVAs by checking the IOMMU page table through the IOMMU.

However, the establishment of a mapping relationship between the PAs and the IOVAs needs to be performed before each buffer is used or released. For example, a 16 MB buffer will be composed of 4096 non-contiguous 4 KB physical blocks in a worst-case scenario. The time and computing power used up by the system to establish the mapping relationship will increase by about ten times.

Therefore, a method and device for reducing cache consumption is needed to buffer the mapping relationship between the PAs and the IOVAs to reduce the time and computing power consumed by the system.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide method and a device for reducing cache consumption to reduce the time and computing power consumed by the system.

In an exemplary embodiment, a method for reducing cache consumption is provided. The method is implemented by a device. The method comprises receiving a registration request from an application, wherein the registration request is used to indicate a buffer with a specific size. The method comprises searching a cache pool in an input/output memory management unit (IOMMU) according to the specific size and determining whether the cache pool has an IOMMU buffer matching the buffer. The method comprises returning a first IOMMU buffer to the application in response to the cache pool having the first IOMMU buffer matching the buffer.

In some embodiments, the first IOMMU buffer has a mapping relationship between physical addresses (PAs) and I/O virtual addresses (IOVAs) of the first IOMMU buffer in the cache pool, and the first IOMMU buffer is accessed by the application via the IOMMU according to the mapping relationship.

In some embodiments, the method further comprises obtaining physical blocks according to the specific size from a physical memory in response to the cache pool not having an IOMMU buffer matching the buffer, wherein each physical block has a physical address (PA), mapping non-contiguous PAs corresponding to the physical blocks into contiguous I/O virtual addresses (IOVAs) in an IOVA buffer pool, and providing the physical blocks for the application to access according to the contiguous IOVAs.

In some embodiments, the method further comprises receiving a release request, wherein the release request is used to instruct the IOMMU to release a second IOMMU buffer, obtaining a score indicator of the second IOMMU buffer; determining whether the score indicator of the second IOMMU buffer is greater than a threshold, and buffering the second IOMMU buffer into the cache pool in response to the score indicator of the second IOMMU buffer being greater than the threshold.

In some embodiments, the method further comprises releasing the second IOMMU buffer in response to the score indicator of the second IOMMU buffer not being greater than the threshold.

In some embodiments, the score indicator of the second IOMMU buffer is related to a size of the second IOMMU buffer and a usage of the second IOMMU buffer within a period of time.

In some embodiments, the method further comprises obtaining an optimal number of cache blocks of the first IOMMU buffer, determining whether a current number of cache blocks of the first IOMMU buffer exceeds the optimal number of cache blocks of the first IOMMU buffer, and buffering the first IOMMU buffer into the cache pool when the current number of cache blocks of the first IOMMU buffer does not exceed the optimal number of cache blocks of the first IOMMU buffer.

In some embodiments, the method further comprises releasing the first IOMMU buffer when the current number of cache blocks of the first IOMMU buffer exceeds the optimal number of cache blocks of the first IOMMU buffer.

In some embodiments, the optimal number of cache blocks of the first IOMMU buffer is greater than a maximum number of instantaneous remaining blocks, and the maximum number of instantaneous remaining blocks is equal to the number of cache blocks used by the application minus the number of cache blocks released by the IOMMU.

In some embodiments, the method further comprises receiving a reclamation notification, wherein the reclamation notification is used to instruct the IOMMU to release a predetermined number of IOMMU buffers in the cache pool, obtaining a score indicator of each IOMMU buffer, and releasing the IOMMU buffers in ascending order of score indicators until a number of released IOMMU buffers reaches the predetermined number.

In some embodiments, the method further comprises training a model to determine whether each IOMMU buffer in the cache pool needs to be buffered or released, wherein the model is based on a convolutional neural network (CNN) model.

In an exemplary embodiment, a device for reducing cache consumption is provided. The device comprises a memory and an input/output (IO) memory management unit (IOMMU) communicatively coupled to the memory. The IOMMU including circuitry to receive a registration request from an application, wherein the registration request is used to indicate a buffer with a specific size, search a cache pool in the IOMMU according to the specific size and determining whether the cache pool has an IOMMU buffer matching the buffer, and return a first IOMMU buffer to the application in response to the cache pool having the first IOMMU buffer matching the buffer.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
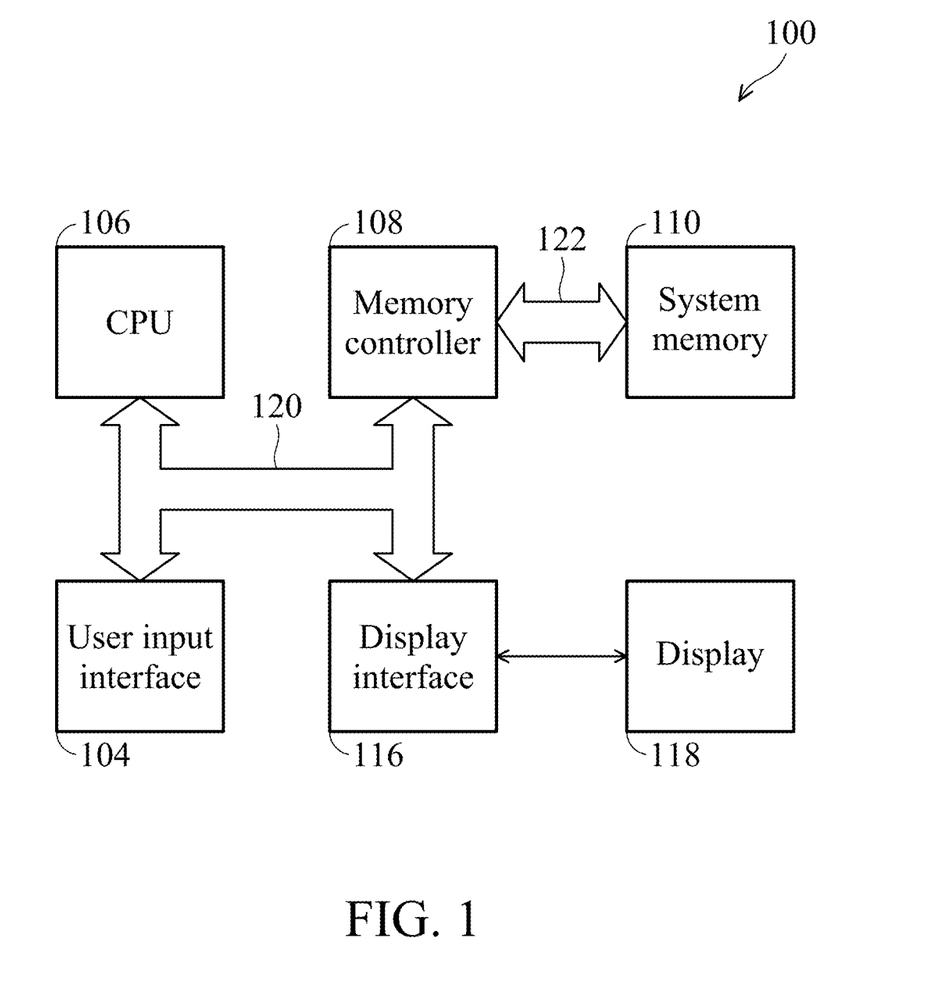
FIG. 1 is a block diagram illustrating an example computing device that may be used to implement the techniques of this disclosure for demand paging in an I/O device.

FIG. 1 is a block diagram illustrating an example computing device 100 that may be used to implement the techniques of this disclosure for demand paging in an I/O device. The computing device 100 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a so-called smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, the computing device 100 may include a user input interface 104, a central processing unit (CPU) 106, one or more memory controllers 108, a system memory 110, a display interface 116, a display 118 and buses 120 and 122. In some cases, all hardware elements shown in FIG. 1 may be on-chip, for example, in a system on a chip (SoC) design. The user input interface 104, the CPU 106, the memory controllers 108 and the display interface 116 may communicate with each other using the bus 20. The memory controllers 108 and the system memory 110 may also communicate with each other using the bus 122. The buses 120 and 122 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices with the same or different components may be used to implement the techniques of this disclosure.

The CPU 106 may comprise a general-purpose or a special-purpose processor that controls operation of the computing device 100. A user may provide input to computing device 100 to cause the CPU 106 to execute one or more software applications. The software applications that execute on the CPU 106 may include, for example, an operating system, a word processor application, an email application, a spread sheet application, a media player application, a video game application, a graphical user interface application or another program. The user may provide input to the computing device 100 via one or more input devices (not shown) such as a keyboard, a mouse, a microphone, a touch pad, a touch screen, or another input device that is coupled to the computing device 100 via the user input interface 104.

The software applications that execute on the CPU 106 may include one or more graphics rendering instructions that instruct the CPU 106 to cause the rendering of graphics data to the display 118. In some examples, the software instructions may conform to a graphics application programming interface (API), such as, an Open Graphics Library (OpenGL®) API, an Open Graphics Library Embedded Systems (OpenGL ES) API, an Open Computing Language (OpenCL®) API, a Direct3D API, an X3D API, a RenderMan API, a WebGL API or any other public or proprietary standard graphics API.

The memory controllers 108 facilitate the transfer of data going into and out of the system memory 110. For example, the memory controllers 108 may receive memory read and write commands, and service such commands with respect to the memory system 110 in order to provide memory services for the components in the computing device 100. The memory controllers 108 are communicatively coupled to the system memory 110 via the memory bus 122. Although the memory controllers 108 are illustrated in FIG. 1 as being a processing module that is separate from both the CPU 106 and the system memory 110, in other examples, some or all of the functionality of the memory controller 108 may be implemented on one or both of the CPU 106 and the system memory 110.

The memory controllers 108 may also include one or more memory management units (MMUSs), including an input/output memory management unit (IOMMU) for controlling I/O device access (e.g., a GPU) to the system memory 110. The I/O memory management units may implement a virtual memory system. The virtual memory space may be divided into a plurality of virtual blocks. These virtual blocks may be contiguous, but the physical blocks in the system memory 110 to which these virtual blocks correspond may not be contiguous in the system memory 110. Blocks may be considered as the minimum units that an MMU may be able to manage.

Figure 2:
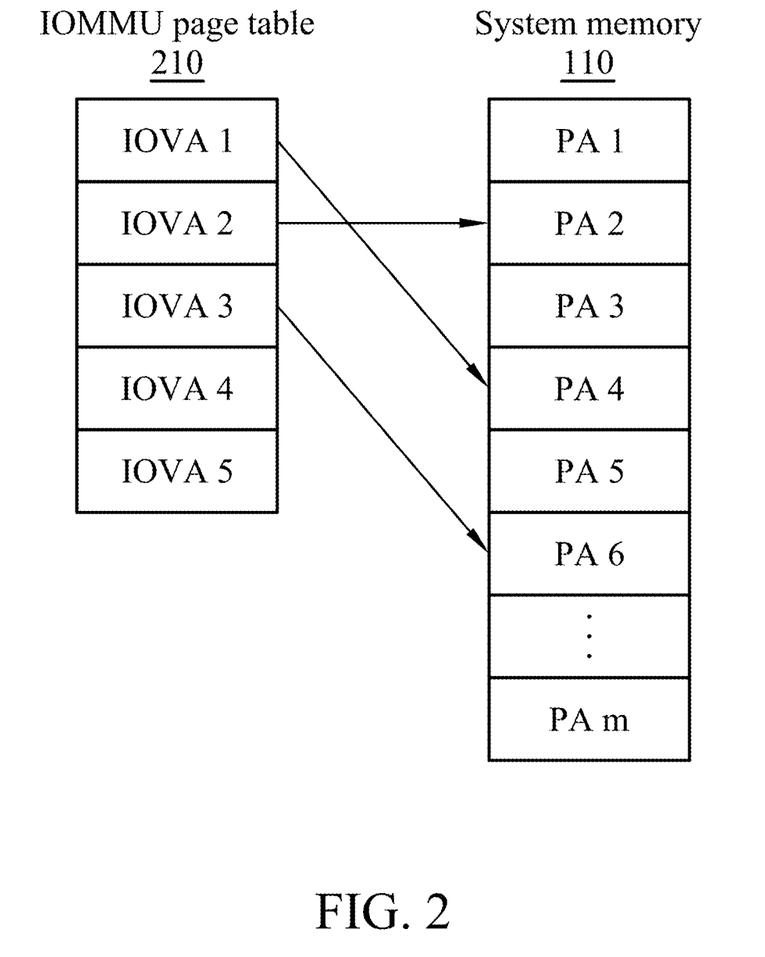
FIG. 2 is a conceptual diagram illustrating example an IOMMU page table in the IOMMU and the system memory.

FIG. 2 is a conceptual diagram illustrating example an IOMMU page table 210 in the IOMMU and the system memory 110. The IOMMU is commonly used to maps virtual addresses to physical addresses. The IOMMU page table 210 includes four virtual blocks with virtual addresses (IOVAs 1~5). It should be understood that the IOMMU page table 210 is a virtual construct that is illustrated in FIG. 2 for ease of understanding. The IOMMU may manage the physical memory space by dynamically allocating and releasing blocks of the physical memory.

In FIG. 2, the system memory 110 may include physical addresses (PA1~PAm). The IOMMU may map contiguous virtual addresses IOVAs 1~3 in the IOMMU page table 210 to non-contiguous physical addresses PA4, PA2 and PA6, respectively.

The system memory 110 may store program modules and/or instructions that are accessible for execution by the CPU 106 and/or data for use by the programs executing on the CPU 106. For example, the system memory 110 may store a window manager application that is used by the CPU 106 to present a graphical user interface (GUI) on the display 118. In addition, the system memory 110 may store user applications and application surface data associated with the applications. The system memory 110 may additionally store information for use by and/or generated by other components of the computing device 100. The system memory 110 may include one or more volatile or non-volatile memories or storage devices, such as, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

The display interface 116 may configure the display 118 to display the image represented by the rendered image data. In some examples, the display interface 116 may include a digital-to-analog converter (DAC) that is configured to convert the digital values into an analog signal consumable by the display 118. In other examples, the display interface 116 may pass the digital values directly to the display 118 for processing. The display 118 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. The display 118 may be integrated within the computing device 100. For instance, the display 118 may be a screen of a mobile telephone. Alternatively, the display 118 may be a stand-alone device coupled to computer device 100 via a wired or wireless communications link. For instance, the display 118 may be a computer monitor or flat panel display connected to a personal computer via a cable or wireless link.

Figure 3:
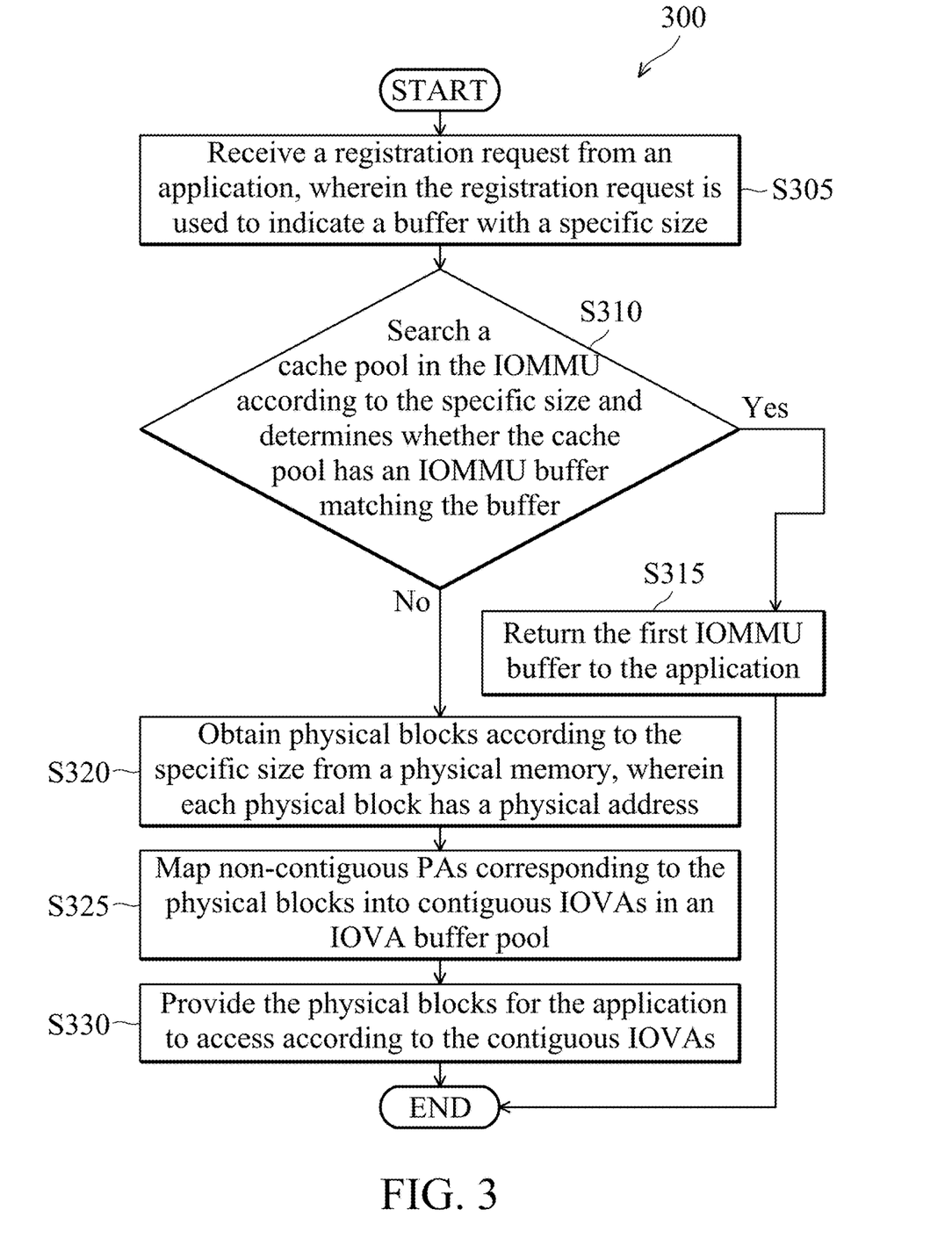
FIG. 3 is a flow chart illustrating a method for reducing cache consumption according to an embodiment of the disclosure.

FIG. 3 is a flow chart 300 illustrating a method for reducing cache consumption according to an embodiment of the disclosure. In this embodiment, the method is implemented by the IOMMU of the computing device 100 in FIG. 1.

In step S305, the IOMMU of the computing device receives a registration request from an application, wherein the registration request is used to indicate a buffer with a specific size.

In step S310, the IOMMU searches a cache pool in the IOMMU according to the specific size and determines whether the cache pool has an IOMMU buffer matching the buffer. In one embodiment, when the size of the IOMMU buffer is greater than or equal to the specific size of the buffer, the IOMMU may determine that the IOMMU buffer matches the buffer.

In response to the cache pool having a first IOMMU buffer matching the buffer ("Yes" in step S310), in step S315, the IOMMU returns the first IOMMU buffer to the application, wherein the first IOMMU buffer has a mapping relationship between physical addresses (PAs) and I/O virtual addresses (IOVAs) of the first IOMMU buffer in the cache pool, and the first IOMMU buffer is accessed by the application via the IOMMU according to the mapping relationship.

Back to step S310, in response to the cache pool not having an IOMMU buffer matching the buffer ("No" in step S310), in step S320, the IOMMU obtains physical blocks according to the specific size from a physical memory, wherein each physical block has a physical address (PA).

Next, in step S325, the IOMMU maps non-contiguous PAs corresponding to the physical blocks into contiguous IOVAs in an IOVA buffer pool.

In step S330, the IOMMU provides the physical blocks for the application to access according to the contiguous IOVAs.

Specifically, each IOMMU buffer in the cache pool has its own mapping relationship. When the IOMMU finds an IOMMU buffer that matches the buffer, the IOMMU can directly re-use the IOMMU buffer with a mapping relationship. When the IOMMU does not find an IOMMU buffer matching the buffer in the cache pool, the IOMMU needs to register a new IOMMU buffer and establish a mapping relationship between the PAs and the IOVAs of the new IOMMU buffer.

Figure 4:
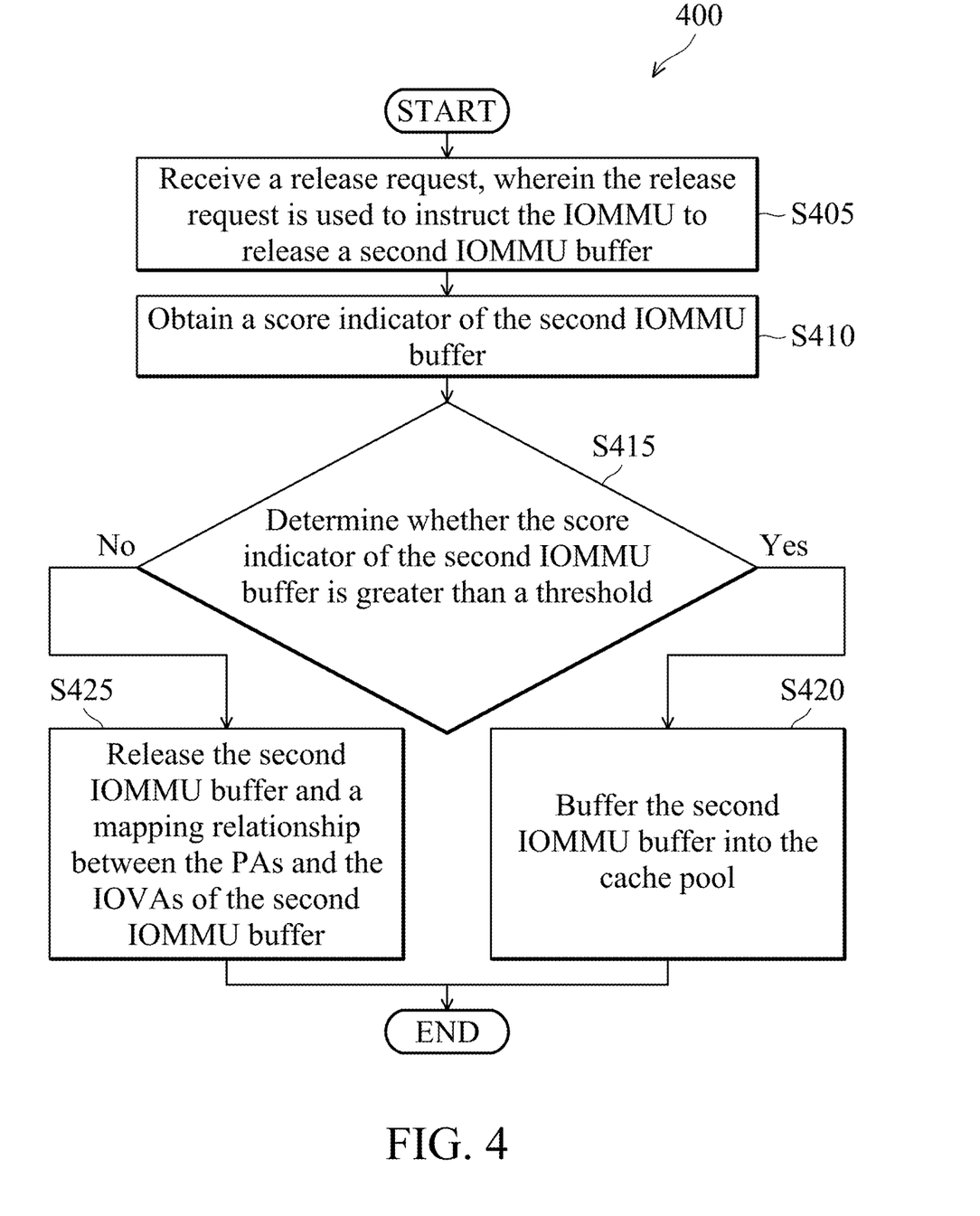
FIG. 4 is a flow chart illustrating a method for releasing IOMMU buffer according to an embodiment of the disclosure.

FIG. 4 is a flow chart 400 illustrating a method for releasing IOMMU buffer according to an embodiment of the disclosure. In this embodiment, the method is implemented by the IOMMU of the computing device 100 in FIG. 1.

In step S405, the IOMMU of the computing device receives a release request, wherein the release request is used to instruct the IOMMU to release a second IOMMU buffer.

Then, in step S410, the IOMMU obtains a score indicator of the second IOMMU buffer, wherein the score indicator of the second IOMMU buffer is related to a size of the cache buffer and a usage of the second IOMMU buffer within a period of time.

Next, in step S415, the IOMMU determines whether the score indicator of the second IOMMU buffer is greater than a threshold.

In response to the score indicator of the second IOMMU buffer being greater than the threshold ("Yes" in step S415), in step S420, the IOMMU buffers the second IOMMU buffer into the cache pool.

Back to step S415, in response to the score indicator of the second IOMMU buffer not being greater than the threshold ("No" in step S425), the IOMMU releases the second IOMMU buffer and a mapping relationship between the PAs and the IOVAs of the second IOMMU buffer.

To give an example, when a user uses an application on the computing device, the IOMMU may count the score indicators of IOMMU buffers used by the application within a period of time. It is assumed that the application uses IOMMU buffers with sizes of 932 KB, 868 KB, 5124 KB and 4 KB, and within a period of time of 3 minutes, the usage of the 932 KB buffer is 513 KB, the usage of the 868 KB buffer is 347 KB, the usage of the 5124 KB buffer is 352 KB and the usage of the 4 KB buffer is 391 KB. The score indicators of 932 KB, 868 KB, 5124 KB and 4 KB buffer can be expressed as follows:

Score indicator of 932 KB buffer=932*0.5+ 513*0.5=722.5
Score indicator of 868 KB buffer=868*0.5+ 347*0.5=607.5
Score indicator of 5124 KB buffer=5124*0.5+ 352*0.5=2378
Score indicator of 4 KB buffer=4*0.5+391*0.5=197.5 wherein 0.5 is the ratio of the size of the buffer and the usage. The IOMMU may determine whether to buffer the IOMMU buffers based on a preset threshold or a dynamic threshold. In this example, the threshold is set to 700, so the IOMMU buffers the 5124 KB buffer and the 932 KB buffer into the cache pool and does not release the mapping relationships corresponding to the 5124 KB buffer and the 932 KB buffer. It should be noted that although the ratio of the size of the buffer and the usage is 0.5 as an example, it should not be limited in the disclosure.

Figure 5:
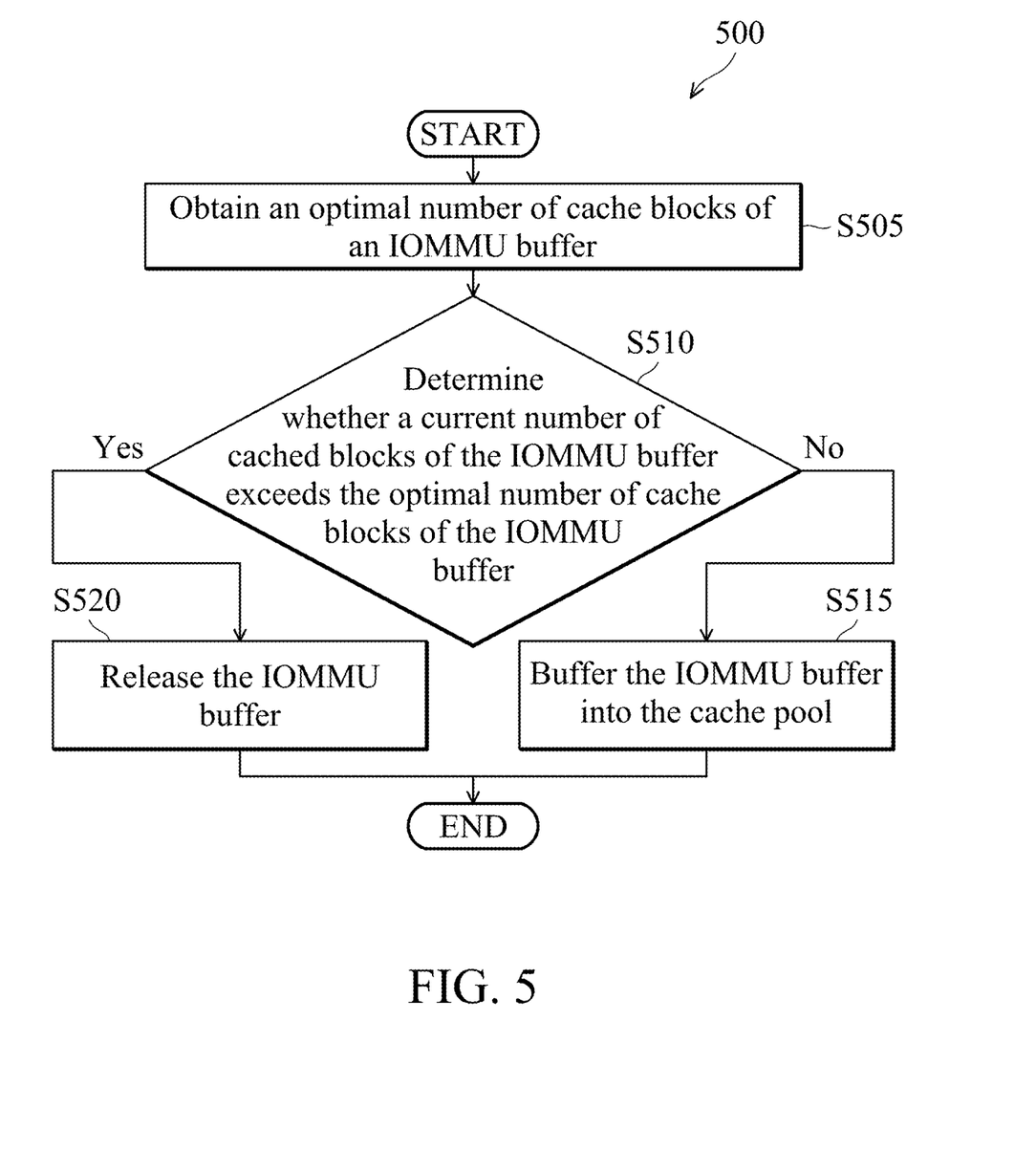
FIG. 5 is a flow chart illustrating a method for releasing IOMMU buffer according to an embodiment of the disclosure.

FIG. 5 is a flow chart 500 illustrating a method for releasing IOMMU buffer according to an embodiment of the disclosure. In this embodiment, the method is implemented by the IOMMU of the computing device 100 in FIG. 1.

In step S505, the IOMMU obtains an optimal number of cache blocks of an IOMMU buffer, wherein the optimal number of cache blocks of the IOMMU buffer is greater than a maximum number of instantaneous remaining blocks, and the maximum number of instantaneous remaining blocks is equal to the number of cache blocks used by the application minus the number of cache blocks released by the IOMMU.

In step S510, the IOMMU determines whether a current number of cached blocks of the IOMMU buffer exceeds the optimal number of cache blocks of the IOMMU buffer.

When the current number of cache blocks of the IOMMU buffer does not exceed the optimal number of cache blocks of the IOMMU buffer ("No" in step S510), in step S515, the IOMMU buffers the IOMMU buffer into the cache pool.

Back to step S510, when the current number of cache blocks of the IOMMU buffer exceeds the optimal number of cache blocks of the IOMMU buffer ("Yes" in step S510), in step S520, the IOMMU releases the IOMMU buffer. In one embodiment, the IOMMU only releases the number of cache blocks that exceeds the optimal number of cache blocks.

It should be noted that the flow chart 500 can be triggered when the IOMMU receives a registration request or a release request. For example, the flow chart 500 can be triggered after the step S305 in FIG. 3 and step S405 in FIG. 4. Although the IOMMU only determines whether to release or buffer one IOMMU buffer in FIG. 5, it should not be limited in the disclosure. In other words, the IOMMU may determine whether to release or buffer each IOMMU buffer in the cache pool.

In another embodiment, the IOMMU may periodically update the score indicator, the optimal number of cache blocks and the maximum number of instantaneous remaining blocks of each IOMMU buffer in the cache pool to regularly determine whether to release or buffer each IOMMU cache buffer.

In some embodiments, the IOMMU may train a model to find an IOMMU buffer with the most suitable size. Due to applications that use IOMMU buffers in specific scenarios, there are obvious rules for the size of the buffer and the instantaneous remaining blocks of buffers. The IOMMU may train a recognition model to recognize features of the buffers corresponding to the applications in various common scenarios, wherein the features are formed into a feature database. The recognition model can determine which size of buffer to be buffered in the cache pool based on the feature database. Finally, the IOMMU feeds back the usage rate of the buffer to the recognition model to improve the accuracy of prediction. In another embodiment, the recognition model is based on a convolutional neural network (CNN) model.

Figure 6:
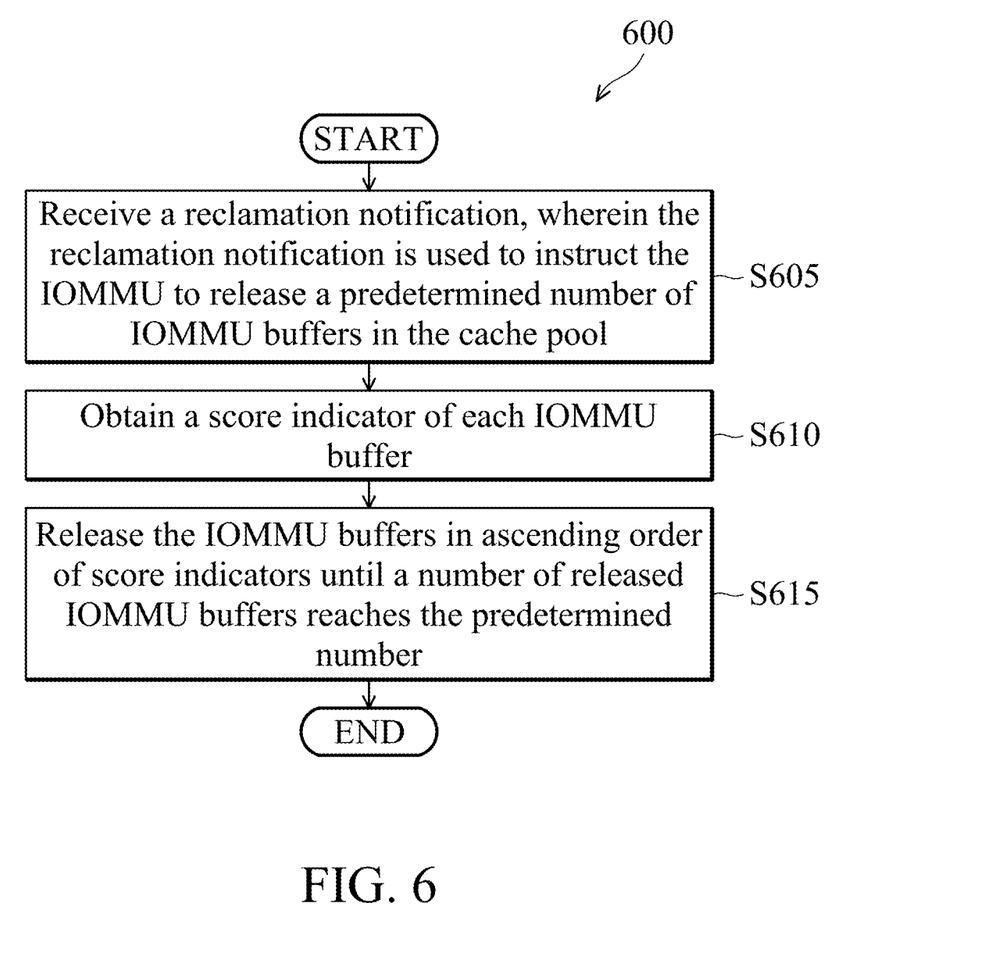
FIG. 6 is a flow chart illustrating a method for reclaiming IOMMU buffer according to an embodiment of the disclosure.

FIG. 6 is a flow chart 600 illustrating a method for reclaiming IOMMU buffer according to an embodiment of the disclosure. In this embodiment, the method is implemented by the IOMMU of the computing device 100 in FIG. 1.

In step S605, the IOMMU receives a reclamation notification, wherein the reclamation notification is used to instruct the IOMMU to release a predetermined number of IOMMU buffers in the cache pool.

Then, in step S610, the IOMMU obtains a score indicator of each IOMMU buffer.

In step S615, the IOMMU releases the IOMMU buffers in ascending order of score indicators until a number of released IOMMU buffers reaches the predetermined number.

As an example, it is assumed that the reclamation notification received by the IOMMU instructs the IOMMU to release three IOMMU buffers in the cache pool. The IOMMU calculates and obtains the score indicators of all IOMMU buffers in the cache pool. The IOMMU releases three IOMMU buffers in ascending order according to the smallest score indicators.

In another embodiment, the user used the computing device can pre-register for an IOMMU buffer with a large size and the IOMMU may buffer the IOMMU buffer with the large size in the cache pool. When an application needs to use a buffer, the IOMMU allocates a part of the IOMMU buffer as the buffer and returns the part of the IOMMU buffer to the application. After the application has used the part of the IOMMU buffer, the IOMMU merges the part of the IOMMU buffer back into the IOMMU buffer with the large size.

FIGS. 7A~7E are flowcharts showing the IOMMU allocating and merging the part of the IOMMU buffers according to an embodiment of the disclosure.

Figure 7A:
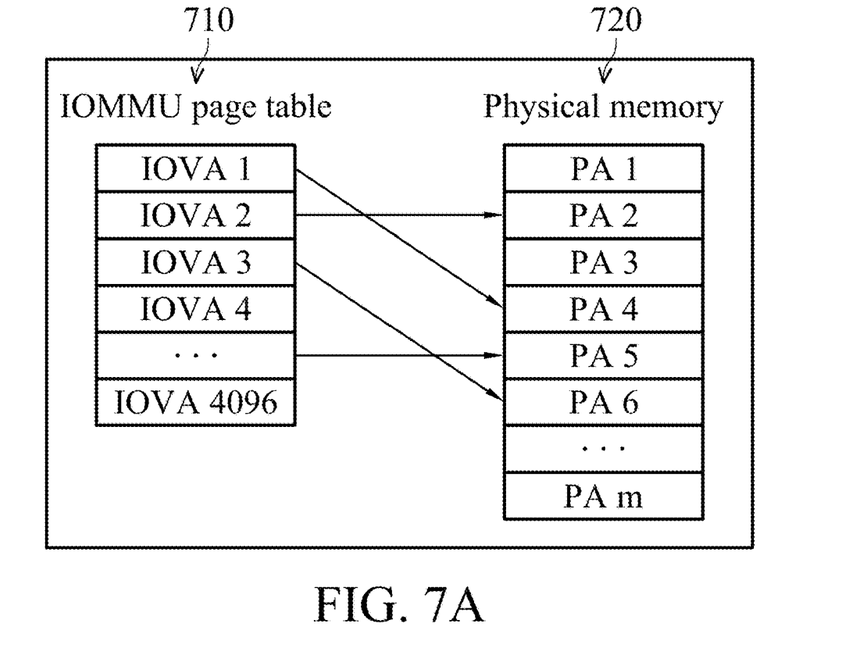
FIGS. 7A-7E are flowcharts showing the IOMMU allocating and merging the part of the IOMMU buffers according to an embodiment of the disclosure.

In FIG. 7A, the user can pre-register an IOMMU buffer via the IOMMU, wherein the IOMMU buffer includes 4096 virtual blocks with virtual addresses (IOVAs 1~4096) in the IOMMU page table 710, the physical memory 720 includes m physical blocks with physical addresses (PAs 1~m), and the IOMMU buffer has a mapping relationship between PAs and IOVAs. For example, IOVA 1 is mapped to PA 4, IOVA 2 is mapped to PA 2, IOVA 3 is mapped to PA 6 and so on.

Figure 7B:
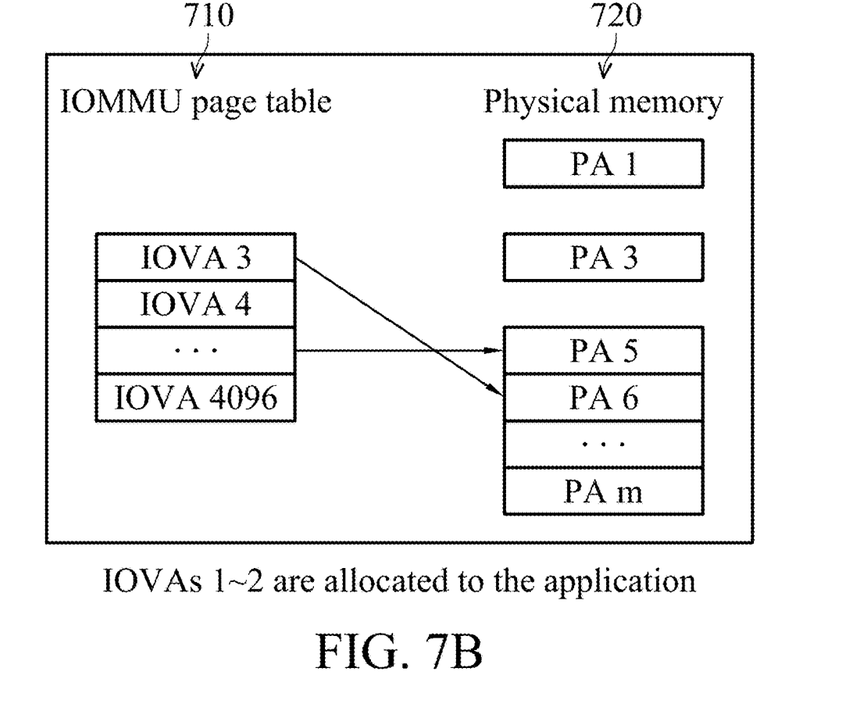
Figure 7C:
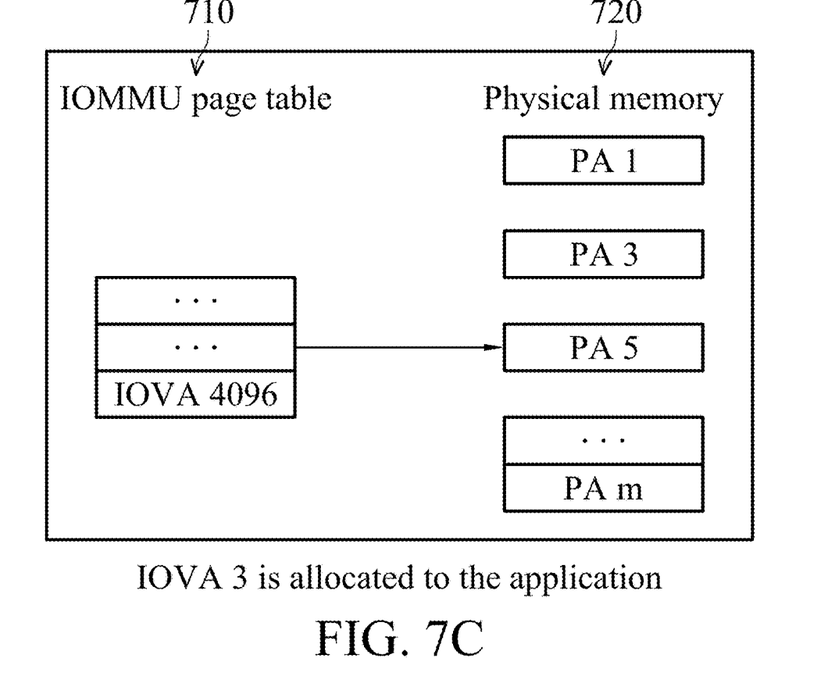

In FIG. 7B, the virtual blocks with IOVAs 1~2 are allocated to the application. In FIG. 7C, the virtual block with IOVA 3 is allocated to the application.

Figure 7D:
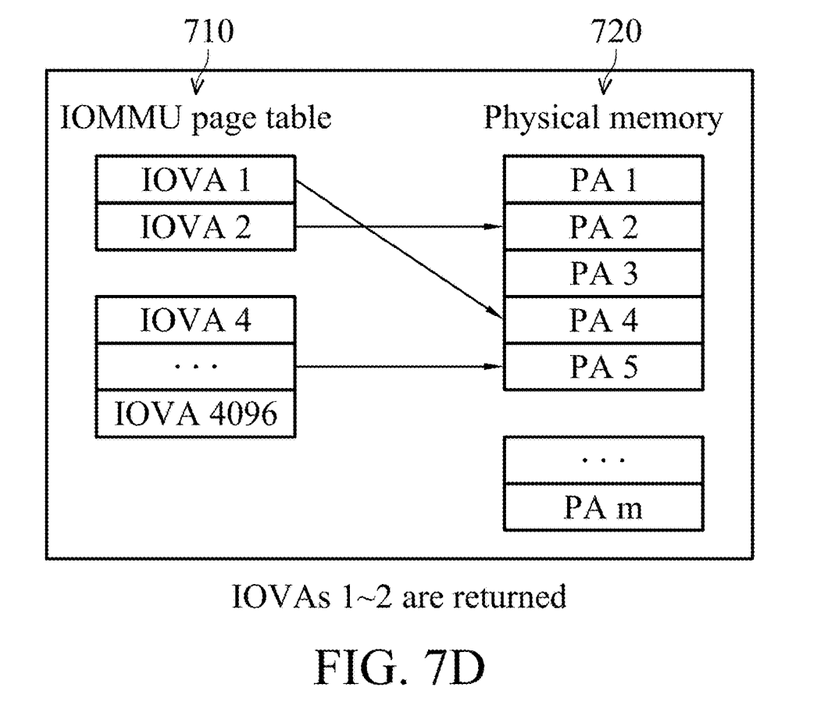
Figure 7E:
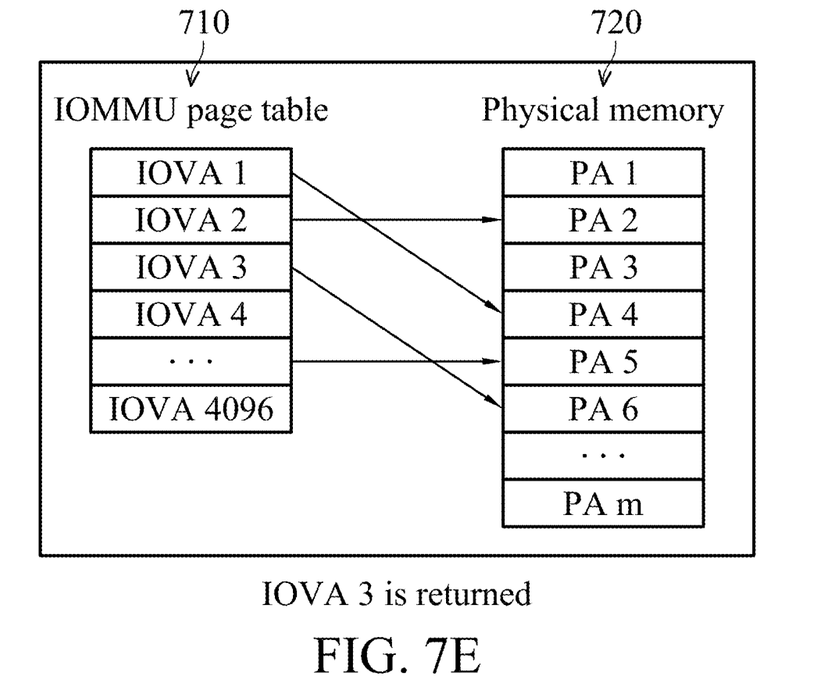

In FIG. 7D, the virtual blocks with IOVAs 1~2 are returned by the application. In FIG. 7E, the virtual block with IOVA 3 is returned by the application.

The process in FIGS. 7A-7E is suitable for types of the buffer with high low-latency requirements. When this types of buffer is placed in the cache pool in the IOMMU, the IOMMU may set this types of buffer with the highest score indicator to prevent this type of buffer from being recycled.

In addition, the IOMMU may train a model to pre-register IOMMU buffers required for different applications according to a feature database including applications and corresponding features, wherein the model is based on a convolutional neural network (CNN) model. After a specific application and features are input into the model, the model calculates an IOMMU buffer with a size that is suitable for this specific application and features. In some embodiments, the features may comprise the size of the buffer required by an application and the number of remaining blocks included in the buffer. The IOMMU can update the training parameters of the model based on the results of buffer usage.

Figure 8:
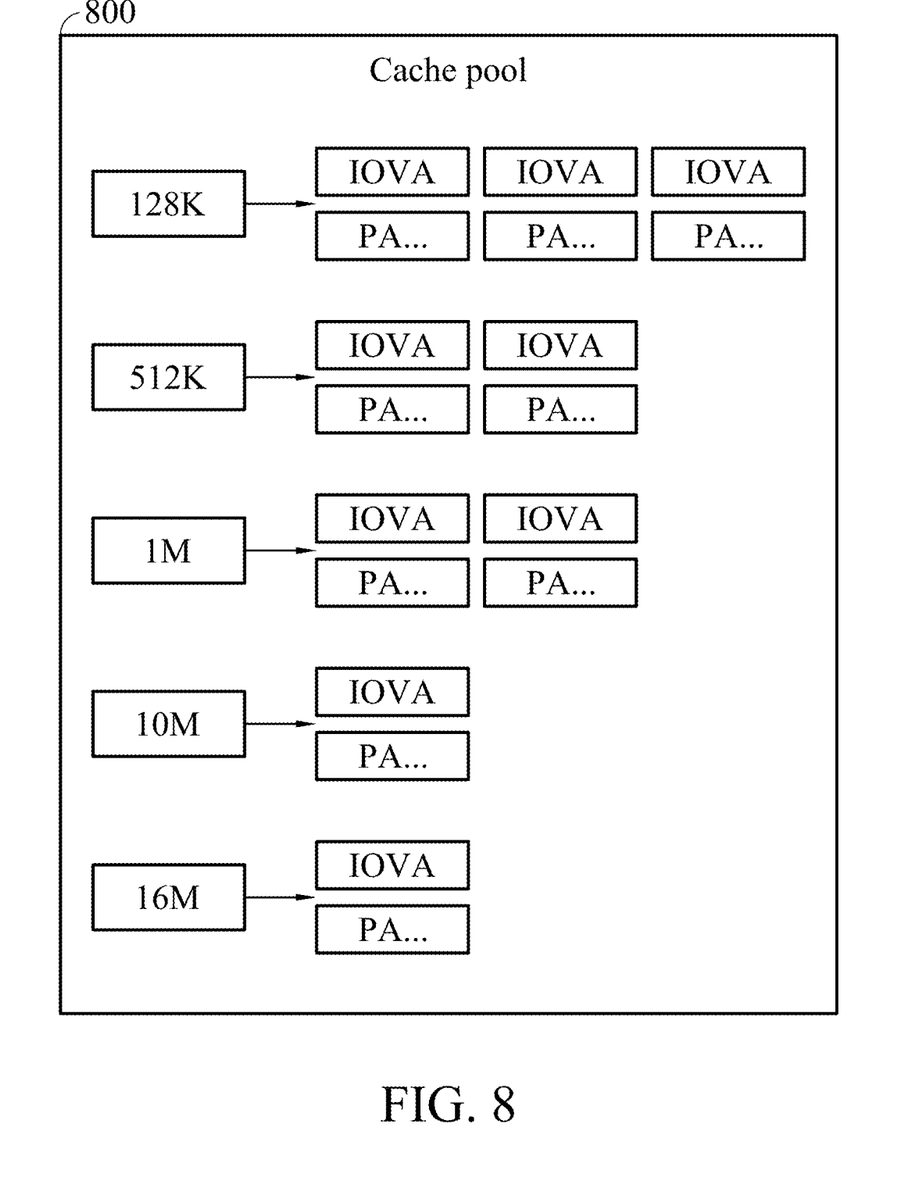
FIG. 8 is a schematic diagram showing the mapping relationship between PAs and IOVAs according to an embodiment of the disclosure.

FIG. 8 is a schematic diagram showing the mapping relationship between PAs and IOVAs according to an embodiment of the disclosure. The mapping relationship between PAs and IOVAs may be stored in the cache pool 800.

For fast search, the IOMMU can be sorted by the size of the IOMMU buffer. In one embodiment, the cache pool 800 has a structure of a red-black tree.

As mentioned above, the method and device for reducing cache consumption in the disclosure establishes a cache pool in the IOMMU to store a mapping relationship between PAs and IOVAs of each IOMMU buffer. By storing the mapping relationship in this fashion, the IOMMU does not need to execute the actions of applying for PAs, allocating IOVAs and establishing a mapping relationship between PAs and IOVAs when the application instructs the buffer to be registered; and the IOMMU does not need to execute the actions of releasing PAs, IOVA and the mapping relationship between PAs and IOVAs when the application instructs the buffer to be released. Thus, the method and device for reducing cache consumption in the disclosure can achieve the purpose of reducing the time and computing power consumed by the system.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing cache consumption, wherein the method is implemented by a device, comprising:
   receiving a registration request from an application, wherein the registration request is used to indicate a buffer with a specific size;
   searching a cache pool in an input/output memory management unit (IOMMU) according to the specific size and determining whether the cache pool has an IOMMU buffer matching the buffer; and
   returning a first IOMMU buffer to the application in response to the cache pool having the first IOMMU buffer matching the buffer.

2. The method for reducing cache consumption as claimed in claim 1, wherein the first IOMMU buffer has a mapping relationship between physical addresses (PAs) and I/O virtual addresses (IOVAs) of the first IOMMU buffer in the cache pool, and the first IOMMU buffer is accessed by the application via the IOMMU according to the mapping relationship.

3. The method for reducing cache consumption as claimed in claim 1, further comprising:
obtaining physical blocks according to the specific size from a physical memory in response to the cache pool not having an IOMMU buffer matching the buffer, wherein each physical block has a physical address (PA);
mapping non-contiguous PAs corresponding to the physical blocks into contiguous I/O virtual addresses (IOVAs) in an IOVA buffer pool; and
providing the physical blocks for the application to access according to the contiguous IOVAs.

4. The method for reducing cache consumption as claimed in claim 1, further comprising:
receiving a release request, wherein the release request is used to instruct the IOMMU to release a second IOMMU buffer;
obtaining a score indicator of the second IOMMU buffer;
determining whether the score indicator of the second IOMMU buffer is greater than a threshold; and
buffering the second IOMMU buffer into the cache pool in response to the score indicator of the second IOMMU buffer being greater than the threshold.

5. The method for reducing cache consumption as claimed in claim 4, further comprising:
releasing the second IOMMU buffer in response to the score indicator of the second IOMMU buffer not being greater than the threshold.

6. The method for reducing cache consumption as claimed in claim 4, wherein the score indicator of the second IOMMU buffer is related to a size of the second IOMMU buffer and a usage of the second IOMMU buffer within a period of time.

7. The method for reducing cache consumption as claimed in claim 1, further comprising:
obtaining an optimal number of cache blocks of the first IOMMU buffer;
determining whether a current number of cache blocks of the first IOMMU buffer exceeds the optimal number of cache blocks of the first IOMMU buffer; and
buffering the first IOMMU buffer into the cache pool when the current number of cache blocks of the first IOMMU buffer does not exceed the optimal number of cache blocks of the first IOMMU buffer.

8. The method for reducing cache consumption as claimed in claim 7, further comprising:
releasing the first IOMMU buffer when the current number of cache blocks of the first IOMMU buffer exceeds the optimal number of cache blocks of the first IOMMU buffer.

9. The method for reducing cache consumption as claimed in claim 7, wherein the optimal number of cache blocks of the first IOMMU buffer is greater than a maximum number of instantaneous remaining blocks, and the maximum number of instantaneous remaining blocks is equal to the number of cache blocks used by the application minus the number of cache blocks released by the IOMMU.

10. The method for reducing cache consumption as claimed in claim 1, further comprising:
receiving a reclamation notification, wherein the reclamation notification is used to instruct the IOMMU to release a predetermined number of IOMMU buffers in the cache pool;
obtaining a score indicator of each IOMMU buffer; and
releasing the IOMMU buffers in ascending order of score indicators until a number of released IOMMU buffers reaches the predetermined number.

11. The method for reducing cache consumption as claimed in claim 1, further comprising:
training a model to determine whether each IOMMU buffer in the cache pool needs to be buffered or released,
wherein the model is based on a convolutional neural network (CNN) model.

12. A device for reducing cache consumption, comprising:
a memory; and
an input/output (IO) memory management unit (IOMMU) communicatively coupled to the memory, the IOMMU including circuitry to:
receive a registration request from an application, wherein the registration request is used to indicate a buffer with a specific size;
search a cache pool in the IOMMU according to the specific size and determining whether the cache pool has an IOMMU buffer matching the buffer; and
return a first IOMMU buffer to the application in response to the cache pool having the first IOMMU buffer matching the buffer.

13. The device for reducing cache consumption as claimed in claim 12, wherein the first IOMMU buffer has a mapping relationship between physical addresses (PAs) and I/O virtual addresses (IOVAs) of the first IOMMU buffer in the cache pool, and the first IOMMU buffer is accessed by the application via the IOMMU according to the mapping relationship.

14. The device for reducing cache consumption as claimed in claim 12, wherein the circuitry is further operative to:
obtain physical blocks according to the specific size from a physical memory in response to the cache pool not having an IOMMU buffer matching the buffer, wherein each physical block has a physical address (PA);
map non-contiguous PAs corresponding to the physical blocks into contiguous I/O virtual addresses (IOVAs) in an IOVA buffer pool; and
provide the physical blocks for the application to access according to the contiguous IOVAs.

15. The device for reducing cache consumption as claimed in claim 12, wherein the circuitry is further operative to:
receive a release request, wherein the release request is used to instruct the IOMMU to release a second IOMMU buffer;
obtain a score indicator of the second IOMMU buffer;
determine whether the score indicator of the second IOMMU buffer is greater than a threshold; and
buffer the second IOMMU buffer into the cache pool in response to the score indicator of the second IOMMU buffer being greater than the threshold.

16. The device for reducing cache consumption as claimed in claim 15, wherein the circuitry is further operative to:
release the second IOMMU buffer in response to the score indicator of the second IOMMU buffer not being greater than the threshold.

17. The device for reducing cache consumption as claimed in claim 15, wherein the score indicator of the second IOMMU buffer is related to a size of the second IOMMU buffer and a usage of the second IOMMU buffer within a period of time.

18. The device for reducing cache consumption as claimed in claim 12, wherein the circuitry is further operative to:

obtain an optimal number of cache blocks of the first IOMMU buffer;

determine whether a current number of cache blocks of the first IOMMU buffer exceeds the optimal number of cache blocks of the first IOMMU buffer; and buffer the first IOMMU buffer into the cache pool when the current number of cache blocks of the first IOMMU buffer does not exceed the optimal number of cache blocks of the first IOMMU buffer.

19. The device for reducing cache consumption as claimed in claim 18, wherein the circuitry is further operative to:

release the first IOMMU buffer when the current number of cache blocks of the first IOMMU buffer exceeds the optimal number of cache blocks of the first IOMMU buffer.

20. The device for reducing cache consumption as claimed in claim 18, wherein the optimal number of cache blocks of the first IOMMU buffer is greater than a maximum number of instantaneous remaining blocks, and the maximum number of instantaneous remaining blocks is equal to the number of cache blocks used by the application minus the number of cache blocks released by the IOMMU.

21. The device for reducing cache consumption as claimed in claim 12, wherein the circuitry is further operative to:

receive a reclamation notification, wherein the reclamation notification is used to instruct the IOMMU to release a predetermined number of IOMMU buffers in the cache pool;

obtain a score indicator of each IOMMU buffer; and release the IOMMU buffers in ascending order of score indicators until a number of released IOMMU buffers reaches the predetermined number.

22. The device for reducing cache consumption as claimed in claim 12, wherein the circuitry is further to:

train a model to determine whether each IOMMU buffer in the cache pool needs to be buffered or released, wherein the model is based on a convolutional neural network (CNN) model.

* * * * *